(Model.)
L. ANDERSON.
NUT LOCK.
No. 377,185. Patented Jan. 31, 1888.
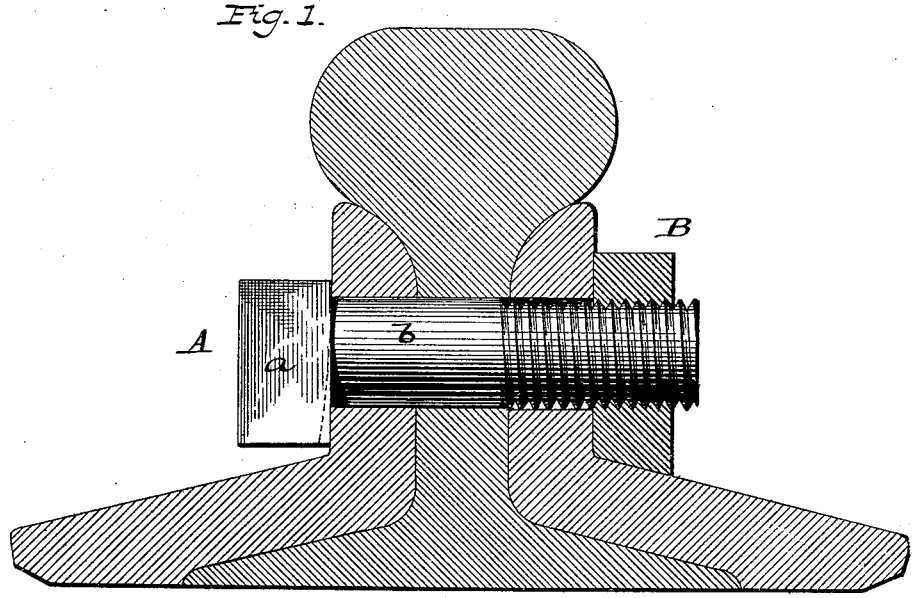
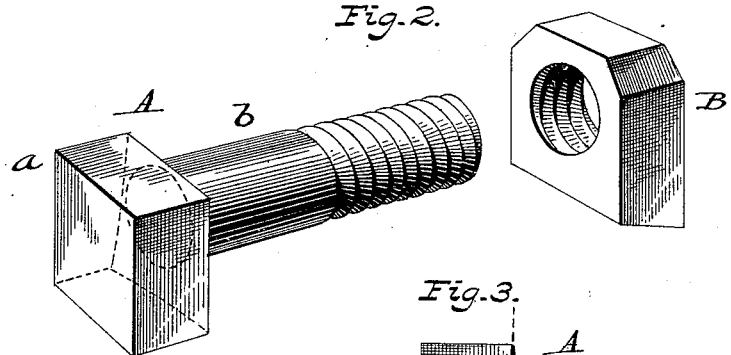
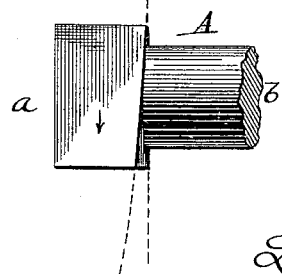
Witnesses
James F. Duhamel
Walter S. Dodge
Lee Anderson
Inventor,
By his Attorneys Dodge & Sons

UNITED STATES PATENT OFFICE.

LEE ANDERSON, OF PARIS, TEXAS, ASSIGNOR OF ONE-THIRD TO PHILLIP M. SPEAIRS, OF SAME PLACE.

NUT-LOCK.

SPECIFICATION forming part of Letters Patent No. 377,185, dated January 31, 1888.

Application filed July 30, 1887. Serial No. 245,708. (Model.)

*To all whom it may concern:*

Be it known that I, LEE ANDERSON, of Paris, in the county of Lamar and State of Texas, have invented certain new and useful Improvements in Nut-Locks, of which the following is a specification.

My invention relates to nut-locks designed more particularly for use in connection with rail-joints, though applicable to other uses; and the invention consists in a novel construction and arrangement of the bolt and nut, as hereinafter set forth, whereby the need of special fastening devices is obviated.

I would state here that I am aware that long prior to my invention it has been proposed to employ gravitating nuts and also bolts with gravitating or eccentric heads, and to these features I make no broad claim. I am not aware, however, that prior to my invention it has been proposed to bevel or incline the inner face of the bolt-head, as hereinafter set forth and claimed.

Referring now to the drawings, Figure 1 is a sectional view of a rail-joint showing my invention in use. Fig. 2 is a perspective view of the bolt and nut separated, and Fig. 3 a detail view.

A indicates the bolt proper, and B the nut, the said bolt being provided with a head, $a$, as shown in Figs. 1 and 2, eccentric to the stem $b$ of the bolt. The head $a$ will advisably be made rectangular or hexagonal, in order that ordinary wrenches may be applied to it and secure a firm hold, and upon reference to Fig. 3 it will be noticed that the inner face of the head is beveled or inclined slightly, so that as the bolt is turned or screwed into the nut this inclined face will act as a wedge and serve to prevent the accidental turning back or unscrewing of the bolt.

As the bolt is turned up or screwed into the nut, the wedge-shaped or inclined face of the head bearing against the fish-plate, or with whatever else it may come into contact, will tend to draw or crowd the parts together, and as the bolt is thus turned it causes the nut to bind upon the threads on the bolt, not enough to injure the threads but sufficient to prevent the accidental loosening of the bolt.

In securing the bolt to its place it should be turned so far as to bring the longer axis of its head vertical, with the greater weight below the center of the bolt, so that there shall be at all times a tendency for the bolt to remain at rest.

The nut B is also made eccentric, or at least is bored eccentric, so that it, like the head of the bolt, shall have its greater weight to the lower side of the centers or axis of the bolt when the latter is in proper position. The bottom or under face of the nut will also preferably be beveled or inclined upward from front to rear, as shown, in order that it may rest squarely upon the fish-plate when the nut-lock is applied to the rail-joints. That portion of the head that is beveled or inclined is the eccentric portion, and consequently greater leverage is secured to prevent unscrewing of the bolt than if the beveled face were close to the shank of the latter.

Having thus described my invention, what I claim is—

1. In combination with a bolt, A, having a cylindrical stem, $b$, and a head, $a$, beveled on its inner face, a nut, B, tapped to receive the threaded end of the bolt and prevented from turning, substantially as shown and described.

2. In combination with a bolt, A, having a cylindrical stem, $b$, and an eccentric head, $a$, beveled on the eccentric portion of its inner face, a nut, B, tapped to receive the bolt and prevented from turning, all substantially as shown.

In witness whereof I hereunto set my hand in the presence of two witnesses.

LEE ANDERSON.

Witnesses:
 JNO. W. ROUNTREE,
 LOUIS GOODING.